(12) United States Patent
Palm

(10) Patent No.: US 6,861,156 B2
(45) Date of Patent: Mar. 1, 2005

(54) METAL FIBER-REINFORCED COMPOSITE MATERIAL AS WELL AS A METHOD FOR ITS PRODUCTION

(75) Inventor: Frank Palm, Munich (DE)

(73) Assignee: EADS Deutschland GmbH, Ottobrunn (DE)

(*) Notice: Subject to any disclaimer, the term of this patent is extended or adjusted under 35 U.S.C. 154(b) by 72 days.

(21) Appl. No.: 10/294,911

(22) Filed: Nov. 15, 2002

(65) Prior Publication Data

US 2003/0108763 A1 Jun. 12, 2003

(30) Foreign Application Priority Data

Nov. 16, 2001 (DE) .......................................... 101 56 125

(51) Int. Cl.$^7$ .............................. B32B 5/08; B32B 5/12; B32B 7/04; B32B 15/14

(52) U.S. Cl. ....................... 428/594; 428/608; 428/615; 428/650; 428/660; 428/668

(58) Field of Search ................................. 428/594, 608, 428/615, 650, 660, 668

(56) References Cited

U.S. PATENT DOCUMENTS

| | | | |
|---|---|---|---|
| 3,764,277 A | | 10/1973 | Hollis |
| 4,753,850 A | | 6/1988 | Ibe et al. |
| 5,227,216 A | * | 7/1993 | Pettit .......................... 428/113 |
| 5,410,133 A | * | 4/1995 | Matsen et al. ............... 219/645 |
| 5,578,384 A | * | 11/1996 | Kingston .................... 428/608 |
| 5,679,441 A | * | 10/1997 | Saelens et al. .............. 428/198 |
| 5,939,213 A | | 8/1999 | Bowden et al. ............. 428/608 |
| 5,951,800 A | * | 9/1999 | Pettit ........................... 156/157 |
| 6,534,194 B2 | * | 3/2003 | Weihs et al. ................. 428/635 |

FOREIGN PATENT DOCUMENTS

| | | |
|---|---|---|
| DE | 3622781 | 1/1988 |
| DE | 4300283 | 7/1994 |
| DE | 19926379 | 12/2000 |
| EP | 0032355 | 5/1984 |
| JP | 2000-263697 | 9/2000 |
| JP | 2001192792 | 7/2001 |

OTHER PUBLICATIONS

Gunnink, Jan Willem, *GLARE: An Improved Damage Tolerance Material*, Proc. 19$^{th}$ European Conference on Materials for Aerospace Applications, Dec. 6–8, 2000, pp. 17–24.

Copy of German Office Action dated Mar. 4, 2003.

* cited by examiner

Primary Examiner—Deborah Jones
Assistant Examiner—Jason Savage
(74) Attorney, Agent, or Firm—Crowell & Moring LLP

(57) ABSTRACT

A metal fiber-reinforced composite material can be produced by providing metal layers and reinforcing layers disposed alternately into a sandwich structure, the reinforcing layers containing fibers of a high-strength metallic material, which are disposed in the form of a loose structure between the metal layers, in order to create a material excess of fibers in the reinforcing layers, the sandwich structure being bonded by a thermomechanical process in such a manner, that the fibers are lengthened because of the excess of material, the sandwich structure being bonded.

8 Claims, 2 Drawing Sheets

METAL FIBER-REINFORCED COMPOSITE MATERIAL AS WELL AS A METHOD FOR ITS PRODUCTION

FIELD OF THE INVENTION

Figure 1:
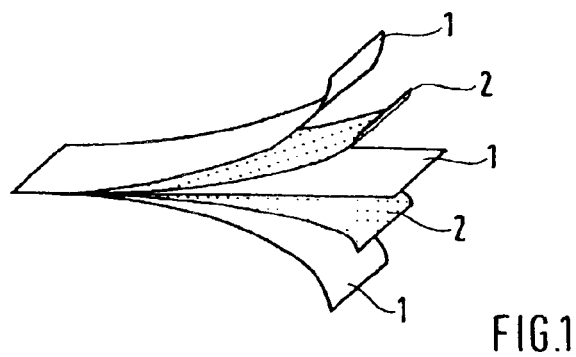

The present intervention relates to a metal fiber-reinforced composite material as well as to a method for its production.

BACKGROUND AND SUMMARY OF THE INVENTION

A large number of metal matrix composite materials are known which contain, as a rule, reinforcing elements in the form of powdery particles or short or long fibers. These elements are partly embedded directly in the metal matrix or bonded to the metal matrix, forming a sandwich structure.

Furthermore, in aviation, another composite material which is also referred to as "fiber metal laminate" (FML) is used, the construction of which is described, for example, in the article by J. W. Gunnink, "GLARE: An Improved Damage Tolerance Material", Proceedings of the 19th European Conference on Materials for Aerospace Applications, Munich, Germany, Dec. 6–8, 2000. The glare material is a sandwich construction and consists of a number of alternating layers of aluminum and glass fiber prepregs, a "prepreg" being a pre-impregnated non-crimped fiber fabric. In the case of the prepreg material used here, the glass fibers are aligned in two mutually perpendicular directions, the fiber directions usually being referred to as 0° and 90°. The number of fibers in the 0° direction and the 90° direction may be the same or different.

The total thickness of the glare material depends, in particular, on the structural requirements. The aluminum layers typically have a thickness of 0.2–0.5 mm and the prepreg layers a thickness of about 0.125 mm. On the other hand, the minimum thickness of the glare material is, for example, 0.525 mm. For practical applications, however, a thickness of 0.85 mm is preferred. Moreover, the glare material has already been produced with a thickness of up to 40 mm. The laminated composite is laminated with an adhesive, typically a duromer epoxy resin.

The advantage of the glare material lies, in particular, in its potential to save weight, so that it is used mainly in aviation, for example, as a skin or fuselage material. In addition, the material has a high damage tolerance. In particular, it offers improved resistance to crack formation, crack propagation and fracture toughness (crack resistance) in comparison to the aluminum aviation materials for pressure cladding the fuselage. By these means, the service life is improved and, with appropriate dimensioning, the weight is reduced.

However, it is a disadvantage that, because of its sandwich construction from different materials, the glare material has a low shear strength, so that the danger of delaminating is very high. This danger is increased by the adhesive used for bonding the sandwich construction, since the adhesive has only a certain, limiting strength. Consequently, in the case of shear or thrust forces, the load-carrying capacity of the material is limited. As a result, faces of holes, for example, are not stable. This means that holes, which are provided in the material, fray or extend under load, so that the shape of the holes is altered in an undesirable manner. Moreover, because of the sandwich construction described, the glare material is moisture-sensitive and the use of different types of material makes it difficult to recycle the composite material.

It is a further disadvantage that the stiffness of the material in certain directions is limited because of the special orientation of the fibers. Moreover, the appreciable anisotropy of the strength properties greatly limits the design freedom ("tailoring").

Moreover, it is disadvantageous that the classical further processing of the material into a semi-finished product, for example, by means of shaping, drilling, heat treating, clamping, welding, forging, etc. is extremely limited, since the ceramic fibers (such as glass, carbon, boron or silicon carbide fibers) are not suitable for the integral process of future construction. Moreover, the glare material cannot be processed by bonding; this is the case for T joints (such as skin-stringer connections) as well as for butt joints.

It is therefore an object of the present invention to provide a composite material, which does not have the disadvantages named above and the strength properties of which are at least similar to or better than those of known composite materials and which can be produced easily and inexpensively and, moreover, can be recycled readily.

This objective is accomplished by a metal fiber-reinforced composite material, in which metal layers and reinforcing layers which are connected to one another alternate, the invention composite material being distinguished by the fact that the reinforcing layers contain fibers of a high-strength, metallic material. These reinforcing layers are disposed in the form of a loose structure between the metal layers, in order to create a material excess of fibers in the reinforcing layers, so that the fibers in the composite material, welded by a thermomechanical process, are extended because of the excess of material.

By introducing high strength, metallic fibers in a sufficient amount, reinforcement is introduced directly into the composite material. At the same time, the metallic inert fibers ensure compatibility with the usual manufacturing and processing procedures for such composite materials (such as rolling, extruding, shaping, clamping, forging or bonding), so that such a composite material can be produced considerably more easily and inexpensively than known composite materials. Because of the compatibility of the fibers, the composite material is furthermore distinguished by less serious structural defects with respect to the E modulus or delamination. Moreover, because of the compatibility of the fibers, recycling is facilitated.

Advisably, the layers of metal consist of a light metal alloy. The alloy has the advantage that the inventive composite material has great potential for saving weight and therefore is very suitable for lightweight construction.

Advisably, the fibers consist of an austenitic or precipitation hardened stainless steel or of a nickel-based alloy. Likewise, a metal alloy can be used, the strength of which is greater than that of the composite material and which is not permanently damaged by a thermomechanical treatment at temperatures of up to a maximum of 600° C. The fibers may, for example, be Ti, TiAl, FeAl, NiAl or Co wires. The materials mentioned have the advantage that they have a very good strength to tenacity ratio, so that semi-finished products, which are produced from the inventive composite material, have a high strength. Moreover, particularly the stainless steels have a neutral corrosion behavior when connected to aluminum or magnesium.

Advantageously, the loose structure is braided, woven or knitted from the fibers. In this way, it is possible to ensure with relatively simple means that a sufficient material excess of fibers is present within the reinforcing layers, so that the loose structure is elongated during the welding of the composite material by rolling, because of the material excess of fibers and not because of their own extensibility.

Pursuant to a further embodiment, the loose structure is a net-like, jumbled or spun structure, produced from the fibers. This embodiment has the advantage that it can be produced particularly easily.

The object of the invention furthermore is accomplished by a method for producing a metal fiber-reinforced composite material, where the metal layers and reinforcing layers are disposed alternately in a sandwich structure, the reinforcing layers containing fibers of a high strength, metallic material, which are placed in the form of a loose structure between the metal layers, in order to create a material excess of fibers in the reinforcing layers and owing to the fact that the sandwich structure is bonded by a thermomechanical process, the fibers extending because of the excess of material and the sandwich structure thus bonded.

This method is particularly distinguished by the simplicity of the process, so that such metal fiber-reinforced composite materials can be produced easily and inexpensively. Furthermore, it is advantageous that the metal fibers are compatible with typical manufacturing and processing procedures, so that the inventive, composite material can be processed further easily into profiles, sheets, semi-finished products, etc.

Advantageously, because metallic fibers of high-strength have been incorporated, the strength and fatigue, but also the crack, propagation and creep behavior of such profiles, sheets, semi-finished products, etc. are improved appreciably.

Preferably, the thermomechanical process is a hot or cold rolling process. Consequently, the method is flexible, since the bonding of the sandwich structure is not limited to a particular process.

Furthermore, it is advisable to provide the metal layers with a solder alloy before bonding of the sandwich structure by means of rolling, the solder alloy preferably being an $AlSi_{12}$ alloy. In addition, other aluminum solder alloys, which can be plated by rolling, can be used. The diffusion and hot-press welding behavior of the metal layers, which generally is not good because of the very stable aluminum oxide ($Al_2O_3$) covering layers, which form on the surface of the metal layers, can be overcome by such a solder alloy.

It is particularly advantageous if the metal layers are bonded before they are actually processed or arranged into a sandwich structure. This is a simple and effective procedure for providing the metal layers with the solder alloy. Furthermore, the use of metal layers, which are provided with a solder alloy, proves to be advantageous particularly when the sandwich structure is heated to a temperature of below approximately 600° C. before it is rolled, so that the solder alloy melts and causes the sandwich structure to bond together. In this way, a stabilization of the sandwich structure before the actual bonding by rolling is achieved at the same time, so that shifting and slipping of the layers during the rolling is effectively avoided and there is no need for an additional holding device.

Pursuant to a further advantageous embodiment, the fibers are surface-treated with zinc, nickel or copper or a different wetting-promoting surface layer. The formation of the alloy during bonding of the sandwich structure is additionally controlled in this way by simple means.

The inventive composite material can be further processed into semi-finished products of all types. It is used mainly in aircraft technology, for example, for fuselage lining and for the outer shell. In addition, it can be used for other vehicle applications in military technology as well as for manufacturing transport containers.

In the following, the invention is explained in greater detail by means of the enclosed Figures.

BRIEF DESCRIPTION OF THE DRAWING FIGURES

Figure 2:
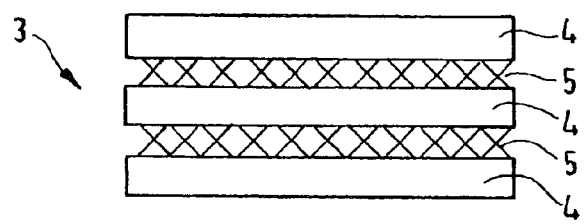
Figure 3A:
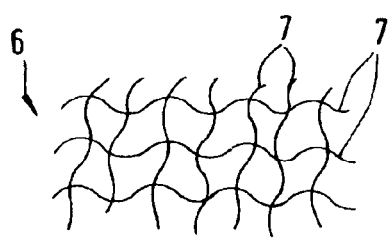
Figure 3B:
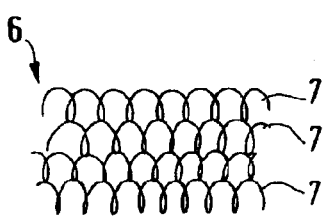
Figure 3C:
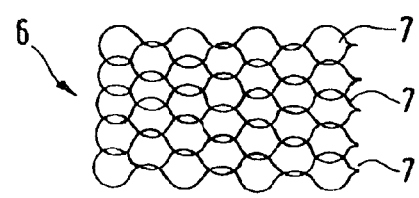
Figure 4A:
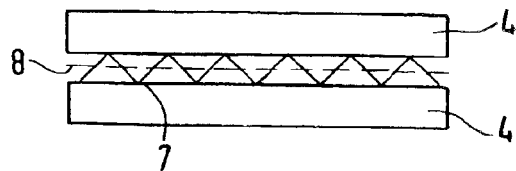
Figure 4B:
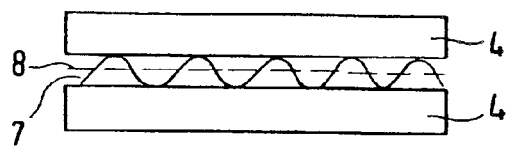
Figure 4C:
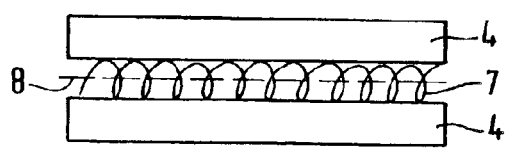
Figure 5A:
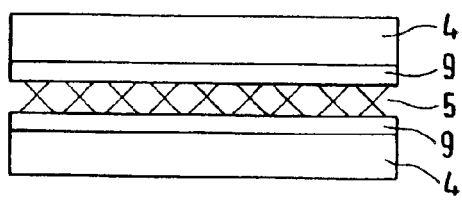
Figure 5B:
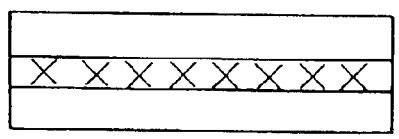
Figure 5C:
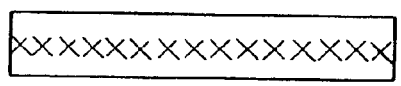
Figure 6:
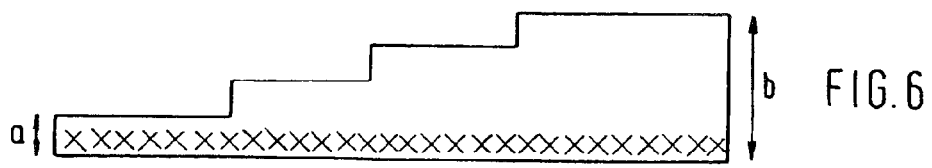

FIG. 1 diagrammatically shows the structure of a typical composite material for aircraft applications of the state of the art;

FIG. 2 diagrammatically shows the construction of an inventive metal fiber-reinforced composite material;

FIGS. 3a–c show three-dimensional, diagrammatic representations of the loose structure disposed between the metal layers;

FIGS. 4a–c show sectional views of the reinforcing layer to explain the configuration of the loose structure and the material excess of fibers in this structure;

FIGS. 5a–c show sectional views of the inventive metal fiber-reinforced composite material; and FIG. 6 shows a component which is produced from the inventive metal fiber-reinforced composite material.

DETAILED DESCRIPTION OF THE DRAWING FIGURES

As already explained above, FIG. 1 diagrammatically shows the construction of the glare composite material which is used mainly in aviation. This composite material consists of a plurality of alternately arranged aluminum and prepreg layers 1 and 2, which are laminated by means of a duromer resin into a sandwich composite.

FIG. 2 shows a diagrammatic representation of the construction of the inventive metal fiber-reinforced composite material. The composite material 3 consists of a plurality of metal layers 4 as well as of a plurality of reinforcing layers 5, which are arranged in an alternating manner to form a stack. The number of layers can be adapted to the respective requirements. For greater clarity, three metal layers 4 and two reinforcing layers 5 are shown in FIG. 2. Moreover, the reinforcing layers 5 are indicated diagrammatically by an "X" in FIG. 2, in order to differentiate the reinforcing layers from the metal layers.

The metal layers 4 typically are sheets of lightmetal alloys. Preferably, aluminum alloys of medium to high-strength are used. However, magnesium sheets or other materials in sheet form, suitable for aviation, can also be used. Accordingly, the inventive, composite material is particularly suitable for lightweight applications. At the same time, the metal layers can be adapted, for example, with respect to their corrosion resistance, to desired parameters.

In contrast to the state of the art described above, the reinforcing layers 5 contain fibers 7 of a high-strength, metallic material. The metal fibers provide the necessary properties, which are required for the production of composite material and the subsequent production processes. Typically, the metal fibers consist of stainless steel (for example, German Standard 1.4548, 1.4541 or 1.4546 or U.S. equivalents 17-4PH, type 321, and type 347, respectively) and are constructed in wire form. Preferably, because of their neutral corrosion behavior and their good strength to tenacity ratio, austenitic or precipitation hardened stainless steel materials are used. In particular, precipitation hardened stainless steels, due to their stabilization behavior (precipitation hardening at temperatures ranging from 480°–580° C.), are very compatible with classical solution annealing and other thermomechanical processes typical for aluminum alloys. In addition, nickel-based alloys or Ti, TiAl, FeAl, NiAl or Co wires can also be used. The fibers produced from the materials named preferably have a wire configuration and a diameter of about 0.001 mm to 1 mm. A wire diameter of 0.1±0.01 mm is especially preferred. The wire-shaped fibers are formed into a loose structure, which are described in greater detail in connection with FIGS. 3 and 4.

FIG. 3 shows a diagrammatic representation of different embodiments of the loose structure, which is labeled 6 in FIG. 3. FIG. 3a shows a loose structure, which is formed from woven fibers 7. In addition, the loose structure can also be a structure, knitted or braided from the fibers 7, as indicated diagrammatically in FIGS. 3b and 3c. A conventional, commercial knitting machine can be used for the knitted fiber structure. As is evident from FIGS. 3a–3c, the loose structure usually has a three-dimensional configuration. Moreover, the fiber orientation can basically be adjusted at will, so that a multi-directional effect of the fibers can be easily achieved. This has the advantage of a uniform load-carrying capability in all spatial directions.

It is furthermore significant that the high-strength, metallic fibers 7 are not disposed in a stretched-out form between the metal layers 4. Instead, there is a sufficient material excess of fibers in the reinforcing layers 5, which is expressed by the concept of a "loose" structure. Such a material excess of fibers is important for the functional efficiency of the inventive metal fiber-reinforced composite material. If such an excess of fibers were not present, the fibers 7 might tear while the sandwich structure 3, shown in FIG. 2, is bonded by means of rolling, so that the reinforcing function of these fibers would be clearly reduced. Of course, the loose structure can also be produced by a simple net-like jumbled or spun arrangement of the fibers.

For a further explanation of the configuration of the loose structure and the material excess of fibers of the latter, the illustrations of FIG. 4 in each case show a sectional view of a reinforcing layer 5. As already mentioned, the fibers 7 of the loose structure 6, disposed within the reinforcing layer 5, are not disposed straight or extended between the metal layers 4, as shown in FIGS. 4a–4c in each case for comparison purposes by a line of dashes 8, but are disposed, for example, in zigzag (FIG. 4a), undulating (FIG. 4b) or spiral (FIG. 4c) fashion. As a result, the total length of each individual fiber 7 is significantly longer than the stretched arrangement, so that there is more fiber material within each individual reinforcing layer. The material excess of fibers is reliably ensured in this way. Of course, the arrangements described in connection with FIGS. 3a–3c and 4a–4c merely explain the inventive concept by way of example and to do not represent any limitation.

The layered construction 3, shown in FIG. 2 with the above-described material excess within the reinforcing layers 5, is bonded by a thermomechanical process (such as a rolling process) to the inventive metal fiber-reinforced composite material. The reduction in thickness during the rolling leads to an elongation of the rolled material, that is, to an elongation of the metal layers as well as of the reinforcing layers. A reduction in thickness by 50 percent typically leads to an elongation of 200 percent, so that the area in the plane of the joint, that is, in the plane of the layers, is doubled. At the same time, within the reinforcing layers 5, the fibers 7 of the loose structure 6 are stretched largely because of their material excess and not because of their own extensibility. Furthermore, during the rolling, the basic material, that is, the material of the metal layers ideally surrounding the loose structure of fibers all around, is kneaded thoroughly and subsequently recrystallized, the loose fiber structure being completely encapsulated in the composite material in order to reinforce it. Because of the metallurgically inert fibers used, which are compatible with the procedures for manufacturing lightmetal materials, such as rolling, forging, extruding, shaping, stretching, welding, etc., (that is, the fibers are not degraded at temperatures ranging up to 650° C.), the fibers can be introduced directly into the composite material, in order to effectively reinforce the basic material. A semi-finished product, produced from such a composite material, accordingly has all the positive properties of the basic material, in conjunction with the special, positive capabilities with which the composite material is endowed because of the incorporation of the high-strength (1000–2500 MPa or more), but very ductile metal fibers (in comparison to ceramic fibers).

It should also be noted that the rolling process can be carried out by means of cold or hot rolling, so that the manufacturing process is not limited to a particular process. Moreover, this processing step can be integrated easily, for example, into an extrusion process. This simplifies the production of profiles and semi-finished products from such a metal fiber-reinforced composite material.

In the following, the manufacturing process for the metal fiber-reinforced composite material is discussed in detail by means of FIGS. 5a–5c. An alternative embodiment is described here, which, in particular, improves the bonding of the sandwich structure shown in FIG. 2, the bonding once again taking place with basic material strength.

In accordance with this alternative embodiment, the metal layers are additionally coated with a solder alloy before the rolling process. This solder alloy is intended to overcome the problems of the stable $Al_2O_3$ covering layer, which is formed on the metal layers. This solder alloy is labeled 9 in FIG. 5a and typically is an $AlSi_{12}$ alloy, which is applied on the surface of the metal layers, for example, by roll bonding. Other aluminum alloys which can be roll bonded, can also be used. Once again, to form the metal fiber-reinforced composite material, several metal layers 4 and reinforcing layers 5 are arranged alternately and stacked to form the sandwich structure shown in FIG. 2 (see FIG. 5a). The fibers of the loose structure can additionally be surface-activated metallurgically with zinc, nickel or copper, in order to improve the formation of the alloy or the welding of the sandwich structure.

The sandwich construction, shown in FIG. 5a, is then heated. This heating can take place, for example, in a separate step in a furnace, preferably under vacuum or an inert gas. The heating of the sandwich composite leads to complete or partial melting of the solder alloy 9, the melting temperature of which is about 580° C. The molten solder alloy surrounds the wire-shaped fibers, infiltrating them. As a result, the surfaces of the metal layers 4, covered with the interfering aluminum oxide ($Al_2O_3$), dissolve so that the disadvantageous effect of the covering aluminum oxide layers is clearly reduced. At the same time, the melting of the solder alloy causes the sandwich structure to bond to a certain degree at the interfaces between the metal and the reinforcing layers, so that the sandwich composite is quasi-bonded. By these means, shifting or mutually slipping of the layers during the rolling process is effectively avoided without the need for expensive holding devices. Furthermore, bubble formation by air inclusions after solution annealing is prevented by the bonding. The bonded sandwich composite is indicated diagrammatically in FIG. 5b.

Subsequently, as already explained above, the sandwich structure, shown in FIG. 5b, is pressure welded hot or by diffusion by a hot or cold rolling process. At the same time, the basic material is kneaded and subsequently recrystallizes and, at the same time, encloses the loose structure of fibers ideally for reinforcing purposes (FIG. 5c). Hot rolling, which is typically carried out at temperatures between 350° and 500° C. may lead briefly to a "liquid phase" of the solder alloy, if the temperature exceeds the melting point of the solder alloy (that is, exceeds 580° C.). The liquid phase usually lasts only for a short while since the solder alloy, as a rule, rapidly re-solidifies.

After the rolling, the composite material is processed further. The details of the further process depend on the basic material used. If the metal layers consist of a non-curing aluminum alloy, the composite is straightened, for example, by cold rolling and subsequently side-trimmed and cooled. If, for example, a curing aluminum alloy is used, the processing steps may be as follows: cold rolling, solution annealing, quenching, straightening and/or hot ageing.

EXAMPLE

Formation of a Metal Fiber-Reinforced Composite Material

A typical aluminum alloy sheet for aviation is constructed from three layers of sheet aluminum 4 as well as from two reinforcing layers 5. Before they are rolled, the layers of sheet aluminum have a thickness of 4 mm and the reinforcing layers have a thickness of about 0.5 mm so that the composite has a total thickness of about 13 mm. After the rolling, the metal fiber-reinforced composite material has a thickness of approximately 6.5 mm. The reinforcing layers may be disposed at any place within the sandwich structure. FIG. 6 shows a component of the inventive composite material with a step-shaped surface, the thin side surface "a" having a height of about 1.5 mm and the thick side surface "b" a height of about 5 mm. The reinforcing layer "X" is disposed at the bottom, so as not to interfere with the step-shaped processing of the composite. Accordingly, it is possible to construct any tailor-made composite material.

With the help of the inventive composite material, the important crack strength properties of cladding sheets and stringers, which are incorporated in the pressure fuselage in the longitudinal axis of the aircraft, are increased appreciably. Moreover, the use for other traffic applications is possible, especially wherever high-strength, high crack toughness and a good impact behavior are necessary. Moreover, the metal fiber-reinforced composite material is also used in military technology or is suitable for manufacturing transport containers of all types.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A metal fiber-reinforced composite material, comprising:
   at least two layers; and
   at least one reinforcing layer disposed between said at least two metal layers, wherein
   said at least two metal layers and said at least one reinforcing layer are welded to one another by a thermomechanical process;
   said at least one reinforcing layer comprises fibers of high-strength, metallic material which are arranged in the form of a three-dimensional loose structure with random fiber orientation in order to provide excess fiber material in said at least one reinforcing layer; and
   said excess fiber material of said at least one reinforcing layer is extended when thermomechanically welded.

2. A metal fiber-reinforced composite material according to claim 1, wherein said at least two metal layers comprise a light metal alloy.

3. A metal fiber-reinforced composite material according to claim 1, wherein said fibers comprise a material selected from the group consisting of austenitic stainless steel, precipitation hardened stainless steel and nickel-based alloy.

4. A metal fiber-reinforced composite material according to claim 1, wherein said fibers comprise a metal alloy, and said metal alloy is stronger than the metal of said at least two metal layers.

5. A metal fiber-reinforced composite material according to claim 1, wherein said fibers are wires comprising a material selected from the group consisting of Ti, TiAl, FeAl, NiAl and Co.

6. A metal fiber-reinforced composite material according to claim 1, wherein said three-dimensional loose structure of said at least one reinforcing layer is a braided, woven or knitted structure.

7. A metal fiber-reinforced composite material according to claim 1, wherein said three-dimensional loose structure of said at least one reinforcing layer is a net-like, jumbled or spun structure.

8. A semi-finished product of a metal fiber-reinforced composite material comprising a metal fiber reinforced composite material according to claim 1.

* * * * *